United States Patent [19]

Vogel

[11] Patent Number: 4,933,607
[45] Date of Patent: Jun. 12, 1990

[54] EXPOSURE DEVICE FOR REPROGRAPHICS AND METHOD

[75] Inventor: Helmut Vogel, Waechtersbach, Fed. Rep. of Germany

[73] Assignee: Siegfried Theimer GmbH, Birstein, Fed. Rep. of Germany

[21] Appl. No.: 193,765

[22] Filed: May 13, 1988

[30] Foreign Application Priority Data

May 19, 1987 [DE] Fed. Rep. of Germany ....... 3716694

[51] Int. Cl.$^5$ ............................................. H05B 37/02
[52] U.S. Cl. ..................................... 315/293; 355/69; 323/209
[58] Field of Search ....................... 315/150, 291, 293; 355/69; 323/209

[56] References Cited

U.S. PATENT DOCUMENTS 3,914,649 10/1975 Hug ...................................... 315/241
4,525,651 6/1985 Ahlgren .......................... 315/291 X

FOREIGN PATENT DOCUMENTS 1522142 8/1969 Fed. Rep. of Germany .
3218096A1 11/1983 Fed. Rep. of Germany .

Primary Examiner—Robert J. Pascal
Attorney, Agent, or Firm—Foley & Lardner, Schwartz, Jeffery, Schwaab, Mack, Blumenthal & Evans

[57] ABSTRACT

An exposure device with a metal-halide lamp for the exposure of photosensitive materials in reprographics includes a circuit having a power source and an adjusting device in the circuit for adjusting the lamp between exposure operations at full power and a power level reduced for stand-by operation. The reduced power level is preselected as a function of predetermined properties of the photosensitive materials.

9 Claims, 2 Drawing Sheets

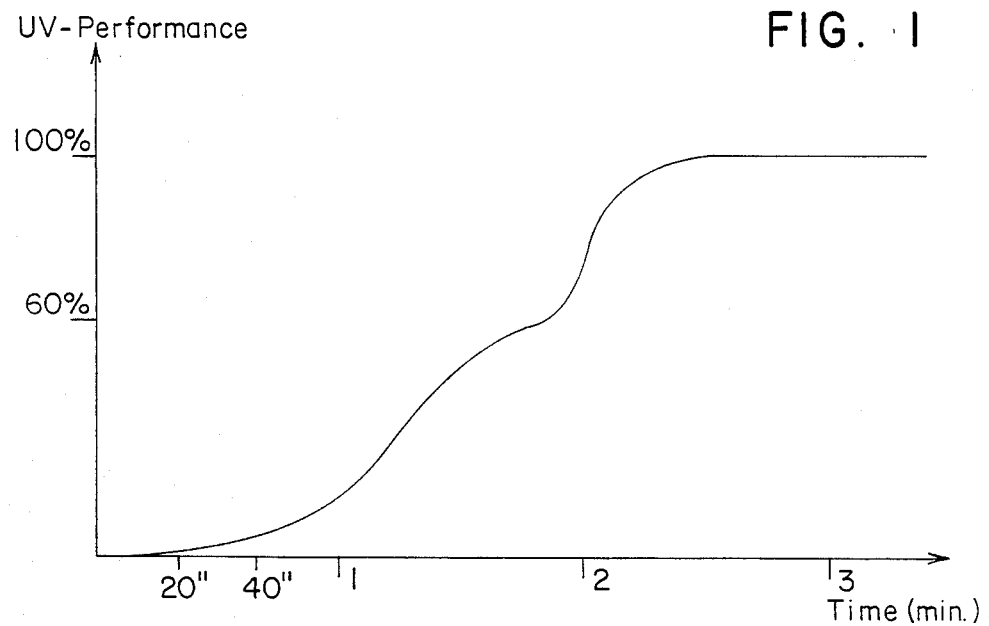
FIG. 1
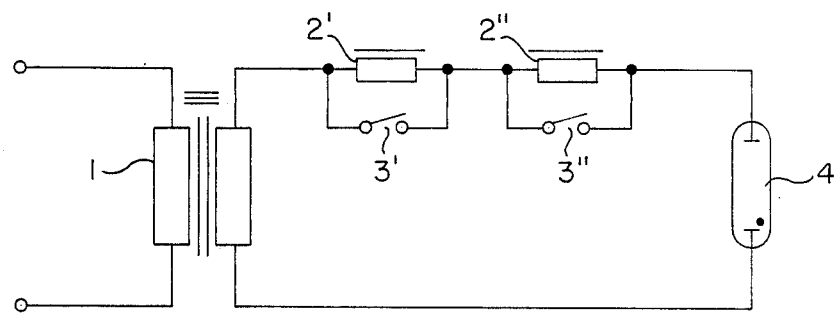
FIG. 2
FIG. 3
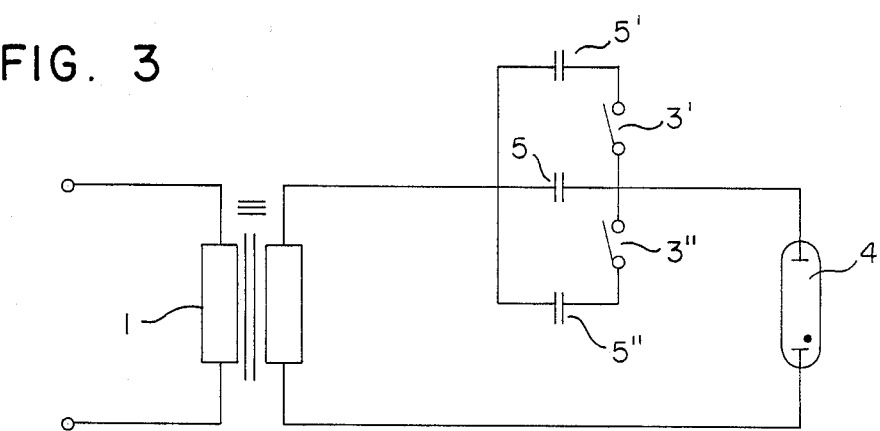

EXPOSURE DEVICE FOR REPROGRAPHICS AND METHOD

BACKGROUND OF THE INVENTION

The present invention relates to the exposure of photosensitive materials in reprographics. It is a question here of the exposure especially of films and printing plates, the exposure devices having one or more metal-halide lamps as a light source.

For metal-halide lamps to reach the desired light flux spectrum, the discharge container must be at a definite minimum temperature. The first thing that happens when this temperature is undershot is that the metal halides introduced to enrich definite spectral lines condense, so that with little change in the operating power consumption the emission spectrum of the lamp falls back to that of an undoped mercury vapor lamp. As the temperature sinks further, mercury also starts to condense increasingly, so that the internal pressure, and therefore the operating power consumption of the lamp drops.

In the graphics industry, the exposure, especially that of the UV-sensitive films and printing plates, requires emission of radiation be as constant as possible. This results in the requirement for a constant lamp temperature, which would mean the lamp burning continually at full illuminating power. This would be unfavorable, because exposures last for only relatively short periods between which interruptions occur in which the light flux is not required. This arises because before each exposure the material to be exposed (master and photosensitive material) must be positioned, and is normally, in addition, brought into intimate contact by the application of a vacuum. The time intervals required for this purpose amount typically to two minutes.

Admittedly lamps have been developed which are completely switched off in the pauses between the exposures, and cold started again in each case, for each exposure. However, this is unsatisfactory because of the necessary starting times in the order of 30 seconds.

Since, therefore, it is not possible in most applications to turn off the lamp completely between the exposures, and disadvantageous to allow continual burning at full power because of the energy consumption necessary, of the required cooling and of the effect on the operating life, it is usual to switch the exposure devices over to a power reduced stand-by operation ("stand-by power") in the pauses between the exposures.

In the known exposure procedures a specific stand-by power is provided, which makes available almost the entire light flux of the required spectrum virtually without a delay at switch-over to the full illuminating power. These stand-by powers normally lie in the range of 35% to 60% of the full illuminating power (electric power).

SUMMARY OF THE INVENTION

Not all photosensitive materials necessarily require an exposure procedure corresponding to the above-mentioned embodiments. For photosensitive material whose exposure times lie in the range of minutes, for example printing plates, it is possible to tolerate a certain starting time at the beginning of exposure. In this connection, the stand-by power can, without substantial loss of quality, be reduced so far that a partial condensation of the metal additives occurs, the latter reevaporating in the first phase of the exposure owing to the attendant increase in temperature. On the other hand, there are photosensitive materials which necessarily require that the lamp should emit the correct emission spectrum from the first moment of exposure. Such materials do not tolerate any "running up" of the lamp during the exposure.

It is, accordingly, an object of the invention to provide a procedure for operating an exposure device with which it is possible, in each case, to achieve a favorable compromise between the opposing demands on the stand-by operation. It follows that it is possible to match the operation flexibly to the particular demands of the photosensitive material.

It is also an object of the invention to provide an apparatus for carrying out the improved procedure.

In accomplishing the foregoing objects, there has been provided according to one aspect of the present invention a method for operating an exposure device with a metal-halide lamp for exposures of photosensitive materials in reprographics, comprising between each exposure carried out at full power, adjusting the lamp back to a power level reduced to a stand-by operation and preselecting the level of the stand-by operation power as a function of predetermined properties of the photosensitive materials.

In accordance with another aspect of the invention, there has been provided an exposure device with a metal-halide lamp for the exposure of photosensitive materials in reprographics, comprising a circuit having a power source; means in the circuit for adjusting the lamp between exposure operations at full power and a power level reduced for stand-by operation; and means for selecting the reduced power level from a plurality of preselected levels as a function of predetermined properties of the photosensitive materials.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be further explained in the following. In the drawing:

FIG. 1 shows a diagram of the UV power emitted by a metal halide lamp during the starting phase;

FIG. 2 shows a first supply circuit of the lamp of an exposure device;

FIG. 3 shows a second supply circuit;

DETAILED DESCRIPTION OF THE PREFERRED EMBODIMENTS

Figure 4:
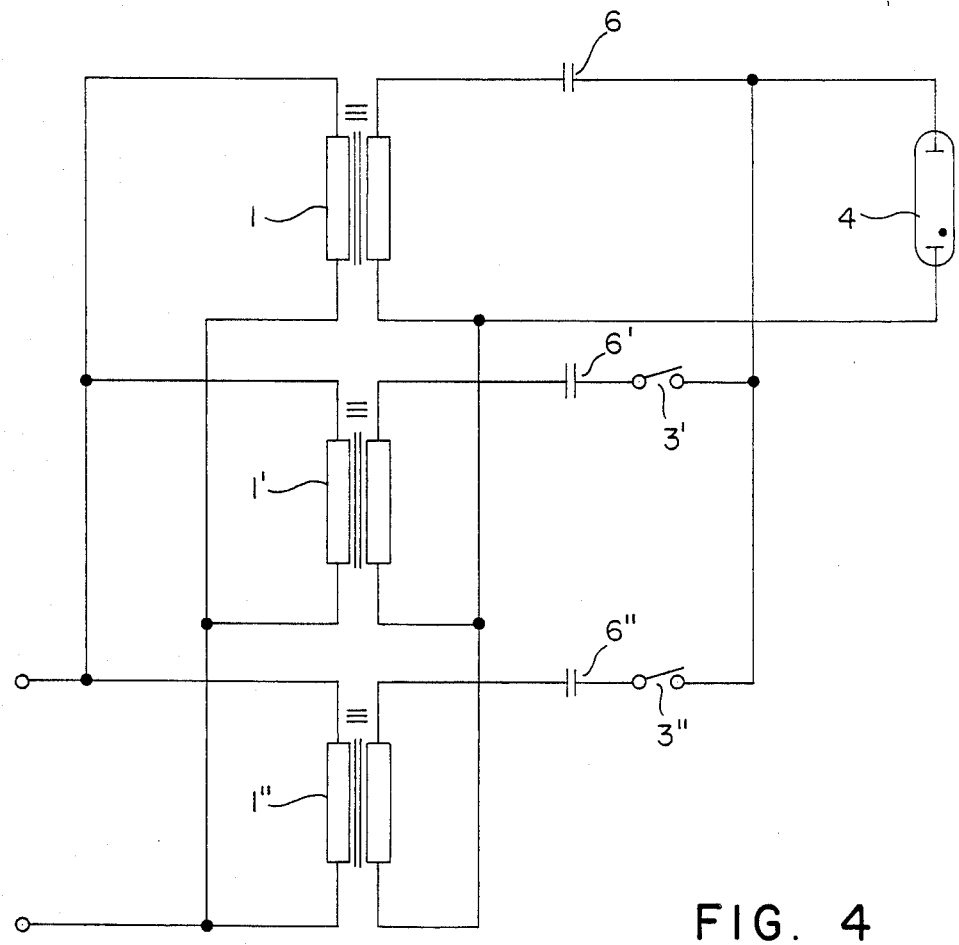
FIG. 4 shows a third supply circuit.

The foregoing objects have been achieved by selecting the level of the stand-by power of the lamp as a function of the properties of the photosensitive material. The exposure device according to the invention designed to conduct this operational procedure therefore has at least two selectable levels of stand-by power which can be switched on depending on the photosensitive material to be exposed. In this connection, for the exposure of short-exposure and low-tolerant photosensitive material it is necessary to select the higher stand-by power, while for the exposure of photosensitive material requiring longer exposure times and being more tolerant the stand-by power can be once again reduced.

Exposure devices are known, in which the lamps can be switched over to more than two power levels: however, in this connection, it is always a question of only one specific stand-by power while various power levels can be selected for the exposure.

The invention allows the user to choose between a low stand-by power with correspondingly low energy consumption and slight demand for cooling air, but a certain running up time with the attendant spectral shift of the emission for the use of materials which are not critical in this regard, and, on the other hand, an enhanced standby power for those cases of application in which the lamp must be kept at the optimum working temperature, so that at the start of an exposure the optimum emission spectrum for achieving reproducible results is immediately available.

The consequence of applying this concept is, first and foremost, a saving in energy, because lamps employed so far have basically been designed to give preference to the emission of a constant spectrum, and therefore consume a stand-by power which is unnecessarily high for a plurality of cases.

The typical starting curve of a metal halide lamp according to FIG. 1 shows that a relatively lengthy period passes before any UV power worth mentioning at all is generated. This is associated with the fact that the cold lamp consumes only a very low power and that this low power heats up the body of the lamp only relatively slowly. Once a certain heating up has been achieved, there is a constant increase in power consumption, and the heating-up proceeds more rapidly.

If the lamp is operated at a very low stand-by power, it is possible nevertheless to arrive at the full output power within a time acceptable for many processes. This time can, for example, amount to 15 seconds.

If the stand-by power is set sufficiently high there is no appreciable change in power from the very beginning of the exposure onwards.

FIGS. 2 to 5 show supply circuits for a lamp 4. Because of the falling current-voltage characteristic of high-pressure lamps, stable operation requires a current-limiting impedance in series with the lamp. For this reason, it is normal to employ leakage-reactance transformers 1, which are cost-effective, and not only transform the voltage to the desired level, but also have a regulating effect and limit the current to a specific value.

Two impedances 2', 2", are provided in the embodiment according to FIG. 2 for the purpose of changing the power of the stand-by operation, and may be bridged in each case by means of a switch 3', 3". Accordingly, it is a question of a purely inductive device, it being possible for the power of the lamp 4 to amount to 1000 watts, for example, if both switches 3', 3" are open, or, on the other hand, to 3000 watts, if one of the switches is closed and to 5000 watts, if both switches are closed. If the impedances 2', 2" are selected with different inductances, there is a possibility of realizing further power steps.

FIG. 3 shows a capacitive device, in which a capacitor 5 is firmly included in the supply circuit of the lamp 4, it being possible to connect two further capacitors 5', 5" in parallel to this capacitor by means of switches 3', 3". With regard to the reduction in the peak inrush current, this supply via capacitors is more favorable and exhibits a behavior for which the current is almost independent of the voltage delivered.

If both switches 3', 3" are open, the lamp has a power of 1000 watts, for example, for one closed switch a power of 3000 watts, and if both switches are closed it has a power of 5000 watts. Here, too, there are more switch steps given various magnitudes for the capacitors 5' and 5".

FIG. 4 shows a supply circuit with three parallel ancillary units each with a leakage-reactance transformer 1, 1' and 1", which serve to power the lamp 4 via the capacitors 6, 6' and 6". In two circuits switches 3' and 3" are provided, so that these may be alternatively switched on or off, thus giving rise to the various supply possibilities.

Figure 5:
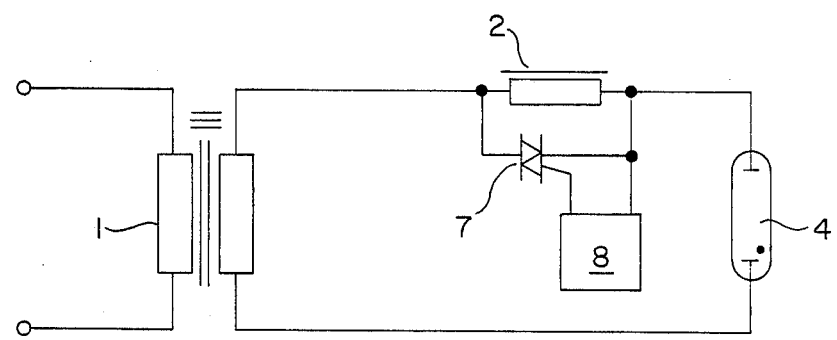
FIG. 5 shows a fourth supply circuit.

Finally, FIG. 5 shows a supply via an impedance 2, which is bridged by a controllable triac 7, it being possible to adjust the power of the lamp 4 by means of a voltage control unit 8 of the triac 7. Accordingly, a phase-angle control takes place here.

In a preferred embodiment of the invention, adjustment is also provided for the cooling air ventilators which are used to cool the lamp. A control circuit is provided which provides for a lower level of cooling air when the lamp is switched to a lower level of standby power and a higher level of cooling for a higher level of stand-by power.

What is claimed is:

1. A method for operating an exposure device with a metal-halide lamp for exposures of photosensitive materials in reprographics comprising between each exposure carried out at full power, adjusting the lamp back to a power level reduced to a stand-by operation and preselecting the level of the stand-by operation power as a function of predetermined properties of the photosensitive materials.

2. An exposure device for use with a metal-halide lamp for the exposure of photosensitive materials in reprographics, comprising:
 a circuit having a power source;
 means in the circuit for adjusting the lamp between exposure operations at full power and a power level reduced for stand-by operation; and
 means for selecting said reduced power level from a plurality of preselected levels as a function of predetermined properties of the photosensitive materials.

3. An exposure device as claimed in claim 2, wherein the power of the stand-by operation can be set between 10% and 60% of the exposure operation at full power.

4. An exposure device as claimed in claim 2, wherein said means for adjusting includes at least two bridgeable impedances switched into the circuit of the lamp.

5. An exposure device as claimed in claim 2, wherein said means for adjusting includes a first capacitor and at least two additional capacitors parallel to said first capacitor and means for switching between said first capacitor and said two additional capacitors.

6. An exposure device as claimed in claim 2, wherein said means for adjusting includes at least first, second and third ancillary units for powering the lamp, of which the first supplies a lowest stand-by power and is permanently connected in the circuit, and including means for selectively switching the second and third units into the circuit.

7. An exposure device as claimed in claim 2, wherein said means for adjusting includes an impedance bridged by a controllable triac switched into the circuit of the lamp.

8. A method for exposing photosensitive materials using a metal halide lamp, comprising the steps of:
   exposing a first photosensitive material at full power of the lamp;
   adjusting the lamp back to a power level reduced to a stand-by level;
   exposing a second photosensitive material at full power of the lamp; and
   selecting said stand-by power level in said adjusting step from a plurality of preselected power levels as a function of exposure properties of the second photosensitive material.

9. A method as claimed in claim 8, further comprising the steps of providing cooling air for the lamp at the stand-by level and adjusting the amount of cooling air provided in direct relationship to the selected stand-by power level.

* * * * *